United States Patent [19]

Miyazawa et al.

[11] Patent Number: 4,501,774

[45] Date of Patent: Feb. 26, 1985

[54] PROCESS FOR THE PRODUCTION OF COBALT-CONTAINING MAGNETIC IRON OXIDE POWDER

[75] Inventors: Kokichi Miyazawa, Suzuka; Kazuo Nakata, Moriyama; Tsuneo Ishikawa, Kawanishi; Ichiro Honma, Moriyama; Masaharu Hirai, Shiga; Makoto Ogasawara; Toshihiko Kawamura, both of Moriyama, all of Japan

[73] Assignee: Ishihara Sangyo Kaisha, Ltd., Osaka, Japan

[21] Appl. No.: 427,537

[22] Filed: Sep. 29, 1982

[30] Foreign Application Priority Data

Oct. 12, 1981 [JP] Japan .................................. 56-162554
Aug. 24, 1982 [JP] Japan .................................. 57-146472

[51] Int. Cl.$^3$ ........................ H01F 10/02; B05D 7/00
[52] U.S. Cl. .................................... 427/215; 75/5 AA;
427/48; 427/128; 427/217; 427/299; 428/403;
428/900
[58] Field of Search ............... 75/5 AA; 427/214, 217,
427/299, 215, 48, 128, 403, 900

[56] References Cited

U.S. PATENT DOCUMENTS 3,770,500 11/1973 Imaoka et al. ................... 427/217 X
4,137,342 1/1979 Kanten ............................ 427/217 X
4,200,680 4/1980 Sasazawa et al. ............... 427/217 X

FOREIGN PATENT DOCUMENTS 1432643 4/1976 United Kingdom .
2051026 1/1981 United Kingdom .
2080783 2/1982 United Kingdom .

Primary Examiner—Michael R. Lusignan
Attorney, Agent, or Firm—Cushman, Darby & Cushman

[57] ABSTRACT

A process is provided for coating the particle surfaces of a phosphor-containing magnetic iron oxide powder with a cobalt compound after subjecting said powder to an activation treatment with an aqueous alkaline and/or acidic medium. The cobalt-containing magnetic iron oxide powder obtained according to this process has excellent coercivity and thermal stability, and the magnetic tape produced by using said powder has not only high coercivity but also excellent squareness, orientability and remanent induction.

12 Claims, No Drawings

PROCESS FOR THE PRODUCTION OF COBALT-CONTAINING MAGNETIC IRON OXIDE POWDER

FIELD OF THE INVENTION

This invention relates to a process for producing a cobalt-containing magnetic iron oxide powder which is useful as a medium for magnetic recording.

The cobalt-containing magnetic iron oxide powder has been popularly used, owing to its high coercivity and excellent fidelity under high frequencies, in the field of magnetic recording media such as videotapes in recent years.

On the other hand, fervent request is voiced lately for more highly densed recording of audio- and videotapes, and simultaneously stronger request is rising for the improvement of performance of the cobalt-containing magnetic iron oxide.

The base magnetic iron oxide powder to be coated wih a cobalt compound is usually produced from acicular hydrous iron oxide obtained from a ferrous salt solution and an alkali through a wet method by heating and dehydrating the acicular hydrous iron oxide to form $\alpha$-$Fe_2O_3$ and then heating and reducing it into $Fe_3O_4$, or by further heating and oxidizing this $Fe_2O_4$ into $\gamma$-$Fe_2O_3$ or converting it into a berthollide compound ($FeO_x$ wherein $1.33 < x < 1.55$). In preparation of these compounds, a phosphor compound is usually added in production of said acicular hydrous iron oxide or before the heat treatment (dehyrating or reducing) to prevent or control formation of the dendritic particles or skeletal pores or growth of the coarse particles due to inter-particle sintering in the course of said heat treatment. Accordingly, the particles of the magnetic iron oxide powder obtained from said heat treatment after adding a phosphor compound contains usually 0.1 to 1.0% by weight as calculated in terms of P based on the magnetic iron oxide.

As a result of extensive studies on the improvement of performance of the cobalt-containing magnetic iron oxides, the present inventors have found that a marked improvement of the magnetic properties such as coercivity is provided if the phosphor-containing particles of a magnetic iron oxide (hereinafter referred to as precursor) are treated with an aqueous medium under atmospheric pressure before coating said particles with a cobalt compound, and the present invention has been completed on the basis of such finding. Thus, the present invention provides a process for producing a cobalt-containing magnetic iron oxide powder, characterized in that a phosphor-containing magnetic iron oxide powder is treated with an aqueous alkaline and/or acidic medium at a temperature of 10° to 95° C. under atmospheric pressure and the thus treated powder particle surfaces are coated with a cobalt compound or with a cobalt compound and other metallic compound.

DETAILED DESCRIPTION OF PREFERRED EMBODIMENTS $\gamma$-$Fe_2O_3$, $Fe_3O_4$ and berthollide compounds ($FeO_x$ wherein $1.33 < x < 1.55$) may be used as the magnetic iron oxide powder or precursor to be coated with a cobalt compound in the process of this invention. Such magnetic iron oxide powder is usually obtained in the following way: an acicular hydrous iron oxide ($\alpha,\beta,\gamma$-FeOOH) produced through a wet method of a ferrous salt solution and an alkali is heated and dehydrated to form $\alpha$-$Fe_2O_3$ and then this $\alpha$-$Fe_2O_3$ is further heated and reduced into $Fe_3O_4$. If necessary, this $Fe_3O_4$ may be further heated and oxidized. Usually a phosphor compound is added during production of said acicular hydrous iron oxide or before its heat treatment, so that the thus obtained magnetic iron oxide powder (precursor) contains phosphor.

In the process of this invention, the phosphor-containing magnetic iron oxide powder (precursor) is treated with an aqueous alkaline and/or acidic medium. This treatment can be easily accomplished by immersing the precursor in an aqueous acidic or alkaline medium using, for example, water, water-alcohol mixture or water-acetone mixture as a solvent and then stirring the immersion solution under atmospheric pressure. Said treatment may be also carried out by forming a fixed bed or a fluidized bed of the precursor and passing the aqueous medium therethrough. It is also possible to combine these treatments using an aqueous medium to perform a multiple-stage treating operation. In this case, the treatment with an aqueous acidic medium may be carried out before and/or after the treatment with an alkaline aqueous medium. The acid concentration of the aqueous medium should be usually 0.01 to 1 mol/l, preferably 0.02 to 0.6 mol/l while the alkali concentration should be usually 0.005 to 3 mol/l, preferably 0.01 to 2 mol/l. A too low acid or alkali concentration (a concentration below the above-defined range) can not provide the desired effect of the medium while a too high concentration is not only disadvantageous economically but also may cause partial dissolution of the magnetic iron oxide particles to impair the particle configuration. Various kinds of inorganic or organic acids as well as their salts may be employed as the acid used for the aqueous medium, but usually, for example, hydrochloric acid, sulfuric acid, hydrofluoric acid, nitric acid, ferrous chloride, aluminum sulfate and the like are used either singly or in combination. As for the alkali used for said aqueous medium, there may be employed the hydroxides, carbonates or ammonium compounds of various kinds of alkali metals or alkaline earth metals, but usually, for example, sodium hydroxide, potassium hydroxide, calcium hydroxide, sodium carbonate, potassium carbonate and the like are used either singly or in combination. Furthermore, this treatment may be carried out at an ambient temperature, preferably 10° to 95° C., more preferably 20° to 80° C. and most preferably 30° to 70° C.

In the process of this invention, the magnetic iron oxide particles which have undergone said treatment with an aqueous medium (such particles being hereinafter referred to as base particles) are then subjected to a coating treatment with a cobalt compound or with a cobalt compound and other metallic compound (these compounds being hereinafter generically referred to as cobalt-containing compound). This coating treatment may be carried out in various ways such as mentioned below: (1) The base particles are dispersed in an aqueous solution of the cobalt-containing compound and then an aqueous alkaline solution is added thereto. (2) The base particles are dispersed in a mixed solution of the cobalt-containing compound and an aqueous alkaline solution. (3) The base particles are dispersed in water, followed by addition thereto of an aqueous cobalt-containing solution and an aqueous alkaline solution. (4) The base particles are dispersed in an aqueous alkaline solution, followed by addition thereto of a cobalt compound-containing solution. (5) The base particles are dispersed in a cobalt compound-containing solution and this dispersion is added dropwise to an aqueous alkaline solution. In these methods, it is possible to make such treatment that a cobalt compound and other metallic compound is coated simultaneously or successively in a suitable order. Said aqueous alkaline solution is added in an amount equivalent or more than equivalent to a cobalt compound and/or other metallic compound to neutralize said cobalt compound and/or other metallic compound, and the resulting reaction product is coated on the surfaces of said base particles. It is usually desirable to perform this coating treatment at a temperature below the boiling point in a non-oxidative atmosphere for a period of usually about 0.1 to 10 hours.

The cobalt compounds usable in the process of this invention include the inorganic or organic acid salts of cobalt such as cobalt sulfate, cobalt chloride, cobalt acetate and the like. The other metallic compound(s) to be used in combination with the cobalt compound include compounds of ferrous, manganese, zinc, chromium, nickel and the like such as, for example, ferrous sulfate, ferrous chloride, manganous sulfate, manganous chloride and the like. As for the amount of such compound(s) used, in the case of using the cobalt compound singly, it is usually used in an amount of 0.5 to 10% by weight as calculated in terms of Co based on the total amount of Fe in the base particles, and in the case of using the cobalt compound in combination with, for example, a ferrous compound, the former is preferably used in an amount of 0.5 to 10% by weight in terms of Co and the latter in an amount of 1 to 20% by weight in terms of Fe. When both the cobalt compound and ferrous compound are coated, the treating effect by said aqueous medium is further enhanced.

The magnetic iron oxide slurry which has undergone said coating treatment may, if necessary, be further subjected to a heat treatment. This heat treatment may be carried out in various ways such as mentioned below: (1) Said slurry is subjected to a hydrothermal treatment at 100° to 250° C. in an autoclave. (2) Said slurry is first filtered and washed with water to obtain a wet cake, then this cake is again dispersed in water to form a slurry and the latter is subjected to a hydrothermal treatment at 100° to 250° C. in an autoclave. (3) The wet cake in the above-mentioned method (2) is heated to 60° to 250° C. in the presence of water vapor. (4) Said wet cake is dried and then subjected to dry heating at 100° to 300° C. These methods may be used either independently or in suitable combination. It is desirable that such heat treatment is carried out under a non-oxidative atmosphere. In the case of performing heating in the presence of water vapor as in the abovesaid method (3), the treating effect by said aqueous medium is additionally enhanced.

In this invention, the term "heat treatment in the presence of water vapor" means a treatment for heating the wet cake in the presence of water vapor in a sealed vessel such as an autoclave or in a tube furnace filled with nitrogen gas, as well as a treatment which comprises drying the wet cake at a low temperature and then heating it in contact with hot water vapor in a fluidized bed and the like. Said treatment may be carried out together with pulverization by means of a high-speed fluid energy mill or the like. Among these treatments, a treatment which comprises heating the wet cake under the saturated water vapor pressure in a sealed vessel filled with nitrogen gas is most preferable.

As described above, according to the process of this invention, the phosphor-containing magnetic iron oxide particles (precursor) are previously treated with an aqueous medium with a relatively simple operation before said precursor is coated with cobalt, whereby it is possible to produce a magnetic iron oxide powder having excellent magnetic properties such as high coercivity without any fear of impairing thermal and mechanical stability of the magnetic recording media produced therefrom. Thus, the process of this invention is of very high industrial use. The mechanism by which the improvements of this invention are brought about is not definitely known, but it is supposed that (1) the particle surfaces of said powder before coated with a cobalt compound are more activated and become more sensitive to the coating reaction by the treatment with an aqueous alkaline and/or acidic medium with the result that (2) the cobalt compound becomes easier to coat on the base particles more uniformly and more solidly and that (3) also synergism of the magnetic properties of both magnetic iron oxide particles (base) and the cobalt coating on the particle surfaces is further encouraged.

EXAMPLE 1

An NaOH solution containing a predetermined amount of pyrophosphoric acid (0.2% by weight as calculated in terms of P based on the $\alpha$-FeOOH nuclear crystal precipitate) was added to a ferrous sulfate solution and the mixed solution was subjected to air oxidation to obtain the $\alpha$-FeOOH nuclear crystals, and then an NaOH solution containing a predetermined amount of orthophosphoric acid (0.2% by weight as calculated in terms of P based on the $\alpha$-FeOOH precipitate) was added thereto gradually and reacted under air oxidation to let the nuclear crystals grow twice the original size.

The resulting reaction solution was filtered and washed with water and a predetermined amount of orthophosphoric acid (0.35% by weight as calculated in terms of P based on $\alpha$-FeOOH) was coated on $\alpha$-FeOOH. The resulting product was dehydrated in a usual way (in air at 650° C.), reduced (in steam-containing hydrogen at 420° C.) and oxidized (in air at 280° C.) to obtain $\alpha$-Fe$_2$O$_3$ (coercivity (Hc): 410 Oe; axial ratio (L/W): 9; major axis length: 0.4–0.5 $\mu$; P content: 0.73% by weight).

The thus obtained $\gamma$-Fe$_2$O$_3$ was suspended in 1 mol/l of an NaOH solution to from 100 g/l of slurry and the latter was treated in a usual reaction vessel (under normal pressure) at 50° C. for 3 hours. The thus treated slurry was filtered and washed with water to obtain treated $\gamma$-Fe$_2$O$_3$. The P content of this product was 0.65% by weight and the yield of the powder was 100%.

100 g of the thus obtained treated $\gamma$-Fe$_2$O$_3$ was dispersed in 1 liter of water to form a slurry, and to this slurry were added 70 ml of a 0.85 mol/l aqueous solution of cobalt sulfate and 125 ml of a 1 mol/l aqueous solution of ferrous sulfate while blowing N$_2$ gas into the solution, followed by further addition of 175 ml of a 10 mol/l aqueous solution of NaOH under stirring, with stirring being continued at room temperature (30° C.) for 5 hours. This slurry was then filtered and washed with water, and the obtained wet cake was put into an autoclave together with water kept in a separate container. After substitution with N$_2$ gas, the autoclave was sealed and the content therein was subjected to a heat treatment in the presence of water vapor at 130° C. for 6 hours. The resulting product was dried in the atmospheric air at 60° C. for 15 hours to obtain the objective cobalt-containing magnetic iron oxide powder (A).

EXAMPLE 2

The same procedure as Example 1 was followed except that the treatment with an aqueous alkaline medium in a usual reaction vessel (under normal pressure) was conducted at 30° C. for 6 hours to obtain the objective cobalt-containing magnetic iron oxide powder (B).

EXAMPLE 3

By following the same procedure as Example 1 except that the treatment with an aqueous alkaline medium in a usual reaction vessel (under normal pressure) was performed at 70° C. for 3 hours, there was obtained the objective cobalt-containing magnetic iron oxide powder (C).

EXAMPLE 4

The procedure of Example 1 was repeated except that the treatment with an aqueous alkaline medium in a usual reaction vessel (under normal pressure) was changed to a treatment with an aqueous acidic medium, that is, a treatment with a 0.08 mol/l aqueous solution of $H_2SO_4$ at 40° C. for 3 hours, to obtain the objective cobalt-containing magnetic iron oxide powder (D).

EXAMPLE 5

The procedure of Example 1 was followed except that the treatment with an aqueous alkaline medium in a usual reaction vessel (under normal pressure) was changed to a treatment with an aqueous acidic medium, that is, a treatment with a 0.28 mol/l aqueous solution of $H_2SO_4$ at 50° C. for 3 hours, to obtain the objective cobalt-containing magnetic iron oxide powder (E).

EXAMPLE 6

The same procedure as Example 1 was followed except that before the treatment with an aqueous alkaline medium in a usual reaction vessel (under normal pressure), $\gamma$-$Fe_2O_3$ was suspended in a 0.28 mol/l aqueous solution of $H_2SO_4$ to form 100 g/l of slurry and this slurry was subjected to an immersion treatment in a usual reaction vessel (under normal pressure) at 50° C. for 3 hours and then filtered and washed with water to obtain the objective cobalt-containing magnetic iron oxide powder (F).

COMPARATIVE EXAMPLE 1

The procedure of Example 1 was repeated except that the treatment with an aqueous alkaline medium in a usual reaction vessel (under normal pressure) was omitted to obtain a cobalt-containing magnetic iron oxide powder (G).

COMPARATIVE EXAMPLE 2

The same procedure as Example 1 was followed except that the treatment with an aqueous alkaline medium in a usual reaction vessel (under normal pressure) was changed to a treatment at 100° C. for 3 hours to obtain a cobalt-containing magnetic iron oxide powder (H).

The coercivity of each of the thus obtained cobalt-containing magnetic iron oxide powder samples (A) to (H) was measured by a usual method. The results are shown in Table 1.

Also, by using each of said samples (A) to (H), there were prepared the blends of the following compositions, and each of these blends was dispersed and ground in a ball mill to produce a magnetic coating materials.

| Blend composition | |
|---|---|
| (1) Cobalt-containing magnetic iron oxide powder | 100 parts by weight |
| (2) Soy-bean lecithin | 1 parts by weight |
| (3) Surfactant | 4 parts by weight |
| (4) Vinyl chloride-acetate copolymer resin | 15 parts by weight |
| (5) Dioctyl phthalate | 5 parts by weight |
| (6) Methyl ethyl ketone | 111 parts by weight |
| (7) Toluene | 122 parts by weight |

Then, each of the thus produced magnetic coating materials was coated and oriented on a polyester film in a usual way and then dried to make a magnetic tape having an approximately 9-micron thick magnetic coating film. The coercivity (Hc), squareness (Br/Bm), orientability (OR) and maximum induction (Bm) of each of the produced magnetic tapes were measured by the usual methods, obtaining the results shown in Table 1.

TABLE 1

| | Sample symbol | $\gamma$-$Fe_2O_3$ powder after surface activation treatment | | Magnetic property of containing magnetic iron oxide powder | Tape measurements | | | |
|---|---|---|---|---|---|---|---|---|
| | | Powder yield (%) | P content* (wt %) | Coercivity Hc (Oe) | Hc (Oe) | Br/Bm | OR | Bm (Gauss) |
| Example 1 | A | 100 | 0.65 | 628 | 655 | 0.82 | 2.1 | 1620 |
| Example 2 | B | " | 0.67 | 608 | 634 | 0.84 | 2.2 | 1540 |
| Example 3 | C | " | 0.57 | 616 | " | 0.81 | 2.1 | 1620 |
| Example 4 | D | 98 | 0.72 | 609 | 624 | 0.84 | " | 1550 |
| Example 5 | E | 89 | 0.65 | 610 | 647 | 0.82 | 2.0 | 1610 |
| Example 6 | F | 89 | 0.45 | 629 | 658 | 0.83 | 2.1 | 1710 |
| Comparative Example 1 | G | — | — | 582 | 604 | 0.82 | 2.1 | 1640 |
| Comparative Example 2 | H | 100 | 0.55 | 527 | 544 | " | " | 1680 |

(Note)
*The P content (wt %) was determined from a chemical analysis.

EXAMPLE 7

An aqueous solution of NaOH containing a predetermined amount of orthophosphoric acid (0.2% by weight as calculated in terms of P based on the α-FeOOH nuclear crystal precipitate) was added to an aqueous solution of ferrous sulfate and the mixed solution was subjected to air oxidation to obtain the α-FeOOH nuclear crystals and the latter were further added gradually with an aqueous solution of NaOH and reacted while undergoing air oxidation to have the nuclear crystals grown twice the original size.

This reaction solution was filtered and washed with water and then a predetermined amount of orthophosphoric acid (0.3% by weight calculated in terms of P base on α-FeOOH) was coated on α-FeOOH. The resulting product was dehydrated in a usual way (in air at 650° C.), reduced (in steam-containing hydrogen at 420° C.) and again oxidized (in air at 160° C.) to obtain γ-Fe$_2$O$_3$ (coercivity (Hc): 395 Oe; axial ratio (L/W): 7; major axis length: 0.4–0.5 μ; P content: 0.44% by weight).

The thus obtained γ-Fe$_2$O$_3$ was suspended in 1 mol/l of an HCl solution to form 100 g/l of slurry and this slurry was treated in an ordinary reaction vessel (under normal pressure) at normal temperature (30° C.) for one hour and then filtered and washed with water to obtain a treated γ-Fe$_2$O$_3$.

100 g of this treated γ-Fe$_2$O$_3$ was dispersed in 1 liter of water to form a slurry, and to this slurry were added 70 ml of a 0.85 mol/l aqueous solution of cobalt sulfate and then 175 ml of a 10 mol/l aqueous solution of NaOH under stirring while blowing N$_2$ gas into the solution, followed by further addition of 125 ml of a 1 mol/l aqueous solution of ferrous sulfate and stirring at room temperature (30° C.) for one hour. This slurry was put into an autoclave, and after replacement of the inside atmosphere of the autoclave with N$_2$ gas, the slurry was subjected to a hydrothermal treatment at 120° C. for 3 hours. The thus reacted slurry was filtered, washed with water and then dried in air at 60° C. for 15 hours to obtain the objective cobalt-containing magnetic iron oxide powder (I).

EXAMPLE 8

The procedure of Example 7 was followed except that the treatment with an aqueous acidic medium in an ordinary reaction vessel (under normal pressure) was changed to a treatment with a 0.7 mol/l aqueous solution of HF at normal temperature (30° C.) for one hour to obtain the objective cobalt-containing magnetic iron oxide powder (J).

COMPARATIVE EXAMPLE 3

The procedure of Example 7 was repeated except that the treatment with an aqueous acidic medium in an ordinary reaction vessel (under normal pressure) was omitted to obtain a cobalt-containing magnetic iron oxide powder (K).

The coercivity of each of the said cobalt-containing magnetic iron oxide powder samples (I) to (K) was measured to obtain the results shown in Table 2.

By using these samples (I) to (K), there were produced the magnetic tapes in the same way as described above, and the coercivity (Hc), squareness (Br/Bm), orientability (OR) and maximum induction (Bm) of each of the produced magnetic tapes were measured by the ordinary methods, obtaining the results shown in Table 2.

TABLE 2

| | Sample symbol | γ-Fe$_2$O$_3$ powder after surface activation treatment | | Magnetic property of containing magnetic iron oxide powder Coercivity Hc (Oe) | Tape measurements | | | |
|---|---|---|---|---|---|---|---|---|
| | | Powder yield (%) | P content* (wt %) | | Hc (Oe) | Br/Bm | OR | Bm (Gauss) |
| Example 7 | I | 90 | 0.44 | 651 | 678 | 0.82 | 2.0 | 1600 |
| Example 8 | J | 77 | 0.42 | 725 | 762 | 0.83 | " | 1770 |
| Comparative Example 3 | K | — | — | 597 | 638 | 0.82 | " | 1570 |

(Note)
*The P content (wt %) was determined from a chemical analysis.

COMPARATIVE EXAMPLE 4

An aqueous solution of NaOH was added to an aqueous solution of ferrous sulfate and the mixed solution was subjected to air oxidation to form the nuclear cyrstals of α-FeOOH, which were then further added with an aqueous solution of NaOH gradually and reacted while undergoing air oxidation to have the nuclear crystals grown four times the original size.

This reaction solution was filtered and washed with water to obtain α-FeOOH and the latter was dehyrated in a usual way (in air at 450° C.), reduced (in steam-containing hydrogen at 350° C.) and again oxidized (in air at 300° C.) to obtain γ-Fe$_2$O$_3$ (coercivity (Hc): 350 Oe; axial ratio (L/W): 10; major axis length: 0.4–0.5 μ).

The thus obtained γ-Fe$_2$O$_3$ was suspended in 1 mol/l of an aqueous solution of NaOH to form 100 g/l of slurry and this slurry was treated in a usual reaction vessel (under normal pressure) at 50° C. for 3 hours and then filtered and washed with water to obtain treated γ-Fe$_2$O$_3$. The yield of this product was 100%.

100 g of the thus obtained treated γ-Fe$_2$O$_3$ was dispersed in 1 liter of water to form a slurry, and to this slurry were added 70 ml of a 0.85 mol/l aqueous solution of cobalt sulfate and 125 ml of a 1 mol/l aqueous solution of ferrous sulfate and then further added 175 ml of a 10 mol/l aqueous solution of NaOH under stirring while blowing N$_2$ gas into the solution, followed by stirring of the mixed solution at room temperature (30° C.) for 5 hours. This slurry was then filtered and washed with water and the obtained wet cake was put into an autoclave together with water kept in a separate container, and after replacement with N$_2$ gas, the autoclave was sealed and its content material was subjected to a heat treatment in the presence of water vapor at 130° C. for 6 hours. After this treatment, the content material was dried in the atmospheric air at 60° C. for 15 hours to obtain a cobalt-containing magnetic iron oxide powder (L).

The procedure of this comparative example was repeated except that the treatment with an aqueous alkaline medium in an ordinary reaction vessel (under normal pressure) was omitted to obtain a cobalt-containing magnetic iron oxide powder (M).

Measurement of coercivity of said samples L and M by an ordinary method gave the figures of 570 Oe (L) and 578 Oe (M). These results show that the effect of this invention can not be obtained form a phosphornoncontaining magnetic iron oxide even if it is treated with an aqueous medium.

What is claimed is:

1. In a process for producing a cobalt-containing magnetic iron oxide powder, comprising preparing acicular hydrous iron oxide from a solution of a ferrous compound and an alkali, dehydrating and, subsequently, reducing or reducing and oxidizing said hydrous iron oxide to form an acicular magnetic iron oxide powder, in which a phosphorus compound is present due to adding to either step of preparing said hydrous iron oxide or step of converting said hydrous iron oxide to said iron oxide powder, and then coating the surface of said iron oxide powder with a cobalt compound or a combination of cobalt and another metallic compound or compounds, the improvement comprising, before the coating step, of:

treating said phosphorus-containing iron oxide powder with an aqueous alkaline medium and/or an aqueous acidic medium under atmospheric pressure and recovering the treated iron oxide powder from the medium.

2. The process according to claim 1, wherein the treatment with the aqueous medium is conducted at a temperature of 10° to 95° C.

3. The process according to claim 2, wherein the treatment with the aqueous medium is conducted at a temperature of 20° to 80° C.

4. The process according to claim 3, wherein the treatment with the aqueous medium is conducted at 25° C.

5. The process according to claim 2, wherein the treatment with the aqueous medium is conducted at a temperature of 30° to 70° C.

6. The process according to claim 1 or 2, wherein the alkali concentration of the aqueous alkaline medium is 0.005 to 3 mol/l.

7. The process according to claim 1 or 2, wherein the acid concentration of the aqueous acidic medium is 0.01 to 1 mol/l.

8. The process according to claim 1 or 2, wherein the phosphor containing magnetic iron oxide powder is first treated with an aqueous acidic medium and then treated with an aqueous alkaline medium.

9. The process according to claim 1 or 2, wherein the phosphor containing magnetic iron oxide powder is first treated with an aqueous alkaline medium and then treated with an aqueous acidic medium.

10. The process according to claim 1 or 2, wherein the particle surfaces of the magnetic iron oxide powder are coated with a cobalt compound and a ferrous compound.

11. The process according to claim 1 or 2, which further comprises heating the coated particles in the presence of water vapor.

12. The process according to claim 1 or 2, which further comprises subjecting the coated particles to a hydrothermal treatment.

* * * * *